US008751475B2

(12) United States Patent
Tedesco et al.

(10) Patent No.: US 8,751,475 B2

(45) Date of Patent: *Jun. 10, 2014

(54) PROVIDING ADDITIONAL INFORMATION RELATED TO EARMARKS

(75) Inventors: Megan Lesley Tedesco, Sammamish, WA (US); Yasser Asmi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1190 days.

This patent is subject to a terminal disclaimer.

(21) Appl. No.: 11/674,894

(22) Filed: Feb. 14, 2007

(65) Prior Publication Data

US 2008/0195660 A1 Aug. 14, 2008

(51) Int. Cl.
*G06F 7/00* (2006.01)

(52) U.S. Cl.
USPC ............. 707/707; 380/204; 380/282; 700/94; 707/602; 707/758; 707/822

(58) Field of Classification Search
USPC ............. 380/204, 282; 700/94; 707/602, 706, 707/758, 822, 707
See application file for complete search history.

(56) References Cited

U.S. PATENT DOCUMENTS

| | | | | |
|---|---|---|---|---|
| 5,920,694 | A | 7/1999 | Carleton et al. | |
| 6,463,444 | B1 | 10/2002 | Jain et al. | |
| 6,551,357 | B1 | 4/2003 | Madduri | |
| 6,567,980 | B1 | 5/2003 | Jain et al. | |
| 6,578,047 | B1 | 6/2003 | Deguchi | |
| 6,801,576 | B1 | 10/2004 | Haldeman et al. | |
| 6,877,134 | B1 | 4/2005 | Fuller et al. | |
| 6,925,197 | B2 | 8/2005 | Dimitrova et al. | |
| 6,956,593 | B1 | 10/2005 | Gupta et al. | |
| 6,957,226 | B2 | 10/2005 | Attias | |
| 7,093,191 | B1 | 8/2006 | Jain et al. | |
| 7,127,454 | B2 | 10/2006 | Deguchi | |
| 7,158,943 | B2 * | 1/2007 | van der Riet | 705/14.41 |
| 7,190,971 | B1 | 3/2007 | Kawamoto | |
| 7,210,039 | B2 * | 4/2007 | Rodgers et al. | 713/182 |
| 7,260,564 | B1 | 8/2007 | Lynn et al. | |
| 7,295,752 | B1 | 11/2007 | Jain et al. | |
| 7,454,401 | B2 | 11/2008 | Yamamoto et al. | |
| 7,490,107 | B2 | 2/2009 | Kashino et al. | |
| 7,505,605 | B2 | 3/2009 | Rhoads et al. | |
| 7,636,733 | B1 | 12/2009 | Rothmuller | |

(Continued)

FOREIGN PATENT DOCUMENTS

| | | |
|---|---|---|
| WO | WO-2006012629 | 2/2006 |
| WO | WO-2006077536 | 7/2006 |

OTHER PUBLICATIONS

Bollay (WO 00/57333).*
Erdogan, E., "An On-Demand Advertising Model for Interactive Television," Apr. 2004, http://idt.gatech.edu/ms_projects/eerdogan/enginerdogan_masters_designdoc.pdf.

(Continued)

*Primary Examiner* — Hosain Alam
*Assistant Examiner* — Bruce Witzenburg
(74) *Attorney, Agent, or Firm* — Micah Goldsmith; Glen Johnson; Micky Minhas

(57) ABSTRACT

Metadata related to a media object may be used to obtain additional information about a mark created by a user in the media object. A media object being played by a user may be marked by creating a mark object, the mark object being used to determine the metadata to be used to obtain additional information related to the mark.

20 Claims, 7 Drawing Sheets

(56) References Cited

U.S. PATENT DOCUMENTS

| | | | | |
|---|---|---|---|---|
| 7,680,781 | B1 * | 3/2010 | Wasserman et al. | 707/999.004 |
| 7,801,910 | B2 | 9/2010 | Houh et al. | |
| RE41,957 | E | 11/2010 | Deguchi et al. | |
| 7,848,948 | B2 | 12/2010 | Perkowski et al. | |
| 7,890,490 | B1 | 2/2011 | Bovenschulte et al. | |
| 8,296,315 | B2 | 10/2012 | Tedesco | |
| 2001/0018693 | A1 | 8/2001 | Jain et al. | |
| 2001/0023436 | A1 * | 9/2001 | Srinivasan et al. | 709/219 |
| 2002/0023020 | A1 | 2/2002 | Kenyon et al. | |
| 2002/0069218 | A1 | 6/2002 | Sull et al. | |
| 2003/0028432 | A1 | 2/2003 | Troyansky et al. | |
| 2003/0149975 | A1 | 8/2003 | Eldering et al. | |
| 2003/0177503 | A1 | 9/2003 | Sull et al. | |
| 2004/0002938 | A1 | 1/2004 | Deguchi | |
| 2004/0019521 | A1 | 1/2004 | Birmingham | |
| 2004/0059720 | A1 | 3/2004 | Rodriguez | |
| 2004/0093393 | A1 | 5/2004 | Calligaro et al. | |
| 2004/0133786 | A1 | 7/2004 | Tarbouriech | |
| 2004/0139047 | A1 | 7/2004 | Rechsteiner et al. | |
| 2004/0177096 | A1 | 9/2004 | Eyal et al. | |
| 2004/0236830 | A1 | 11/2004 | Nelson et al. | |
| 2005/0010787 | A1 | 1/2005 | Tarbouriech | |
| 2005/0055277 | A1 | 3/2005 | Green et al. | |
| 2005/0065853 | A1 * | 3/2005 | Ferreira | 705/26 |
| 2005/0091268 | A1 | 4/2005 | Meyer et al. | |
| 2005/0113066 | A1 | 5/2005 | Hamberg | |
| 2005/0204398 | A1 | 9/2005 | Ryal | |
| 2005/0229227 | A1 | 10/2005 | Rogers | |
| 2005/0234875 | A1 | 10/2005 | Auerbach et al. | |
| 2006/0069998 | A1 | 3/2006 | Artman et al. | |
| 2006/0072785 | A1 * | 4/2006 | Davidson et al. | 382/100 |
| 2006/0085825 | A1 | 4/2006 | Istvan et al. | |
| 2006/0089843 | A1 | 4/2006 | Flather | |
| 2006/0173825 | A1 | 8/2006 | Hess et al. | |
| 2006/0242161 | A1 | 10/2006 | Ten Kate et al. | |
| 2006/0259375 | A1 | 11/2006 | Deguchi | |
| 2007/0005581 | A1 | 1/2007 | Arrouye et al. | |
| 2007/0106693 | A1 | 5/2007 | Houh et al. | |
| 2007/0112837 | A1 | 5/2007 | Houh et al. | |
| 2007/0149114 | A1 | 6/2007 | Danilenko | |
| 2007/0168315 | A1 | 7/2007 | Covannon et al. | |
| 2007/0273754 | A1 | 11/2007 | Cockerton et al. | |
| 2008/0092168 | A1 | 4/2008 | Logan et al. | |
| 2008/0109405 | A1 | 5/2008 | Tedesco et al. | |

OTHER PUBLICATIONS

Jain et al., "Metadata in Video Databases," Sigmod Record, vol. 23, No. 4, Dec. 1994, http://delivery.acm.org/10.1145/200000/190638/p27-jain.pdf?key1=190638&key2=5655452611&coll=GUIDE&dl=GUIDE&CFID=3701082&CFTOKEN=27063820.

Moser et al., "Product Placement as a Marketing Tool in Film and Television," http://www.nssa.us/nssajrnl/22-1/pdf/12.pdf.

Wiles et al., "The Impact of Film Product Placement on Firm Market Value," http://www.kelley.iu.edu/marketing/wiles_jm_11_11_05.pdf.

"Advisory Action", U.S. Appl. No. 11/556,478, (Jan. 7, 2011),3 pages.

"Advisory Action", U.S. Appl. No. 11/556,478, (Jun. 29, 2009),3 pages.

"Final Office Action", U.S. Appl. No. 11/556,478, (Mar. 12, 2009),16 pages.

"Final Office Action", U.S. Appl. No. 11/556,478, (Sep. 24, 2010),22 pages.

"Final Office Action", U.S. Appl. No. 11/556,478, (Jul. 20, 2011),16 pages.

"Non-Final Office Action", U.S. Appl. No. 11/556,478, (Feb. 10, 2011),19 pages.

"Non-Final Office Action", U.S. Appl. No. 11/556,478, (Aug. 29, 2008),14 pages.

"Non-Final Office Action", U.S. Appl. No. 11/556,478, (Oct. 24, 2011),23 pages.

"Non-Final Office Action", U.S. Appl. No. 11/556,478, (Dec. 16, 2009),18 pages.

Dowman, Mike et al., "Web-Assisted Annotation, Semantic Indexing and Search of Television and Radio News", retrieved from http://gate.ac.uk/sale/www05/web-assisted-annotation.pdf#search=%22annotation%20in%20media%20files%2Bpdf%22, (May 10-14, 2005),10 pages.

Schroeter, Ronald et al., "Vannotea—A Collaborative Video Indexing, Annotation and Discussion System for Broadband Networks", retrieved from http://metadata.net/filmed/pub/Vannotea.pdf, (2003),8 pages.

Vembu, Shankar et al., "Towards Bridging the Semantic Gap in Multimedia Annotation and Retrieval", retrieved from http://image.ntua.gr/swamm2006/resources/paper18.pdf, (2006),12 pages.

"Notice of Allowance", U.S. Appl. No. 11/556,478, (Jun. 22, 2012), 13 pages.

"Corrected Notice of Allowance", U.S. Appl. No. 11/556,478, (Aug. 23, 2012), 3 pages.

* cited by examiner

PROVIDING ADDITIONAL INFORMATION RELATED TO EARMARKS

BACKGROUND

This Background is intended to provide the basic context of this patent application and it is not intended to describe a specific problem to be solved.

Media players are in common use among a broad base of users. Radio and television have provided entertainment for generations of users. Portable transistor radios of the 1960s began a trend to smaller and more robust personal media players including very small players storing all digital content on both rotating and non-rotating media. Streaming media is available over both wireless and wired networks and may be displayed on cellular telephones and other portable media devices.

Information about the media being played is often available in the form of a 'now playing' identifier of a radio station genre. Often, however, a listener or viewer is interested in more information than simply what is playing. A listener may wonder what kind of instrument is playing at a given moment or the name of a back up singer. A media viewer may have similar questions related to a location or props in a particular scene. Advertisers may be willing to pay to have advertisements displayed when users desire additional information.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A media player may be operable to accept a user input indicating interest in a media object at a particular point in the sequence during playback of the media object to obtain additional information related to the point in the sequence. In another embodiment, an 'earmark' may be used to search for available information about the media object. The media object itself may contain metadata organized by sequence for use in supplying data. Alternatively, the metadata may provide keywords or phrases used to populate a search for related information. In another embodiment, the metadata may contain one or more URLs for directly accessing related information. The search may be made from the media player or may be performed at a computer using information sent by the media player. Revenue may be generated by charging for the right to display addition information related to the additional object selected.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '__________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instruction and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiment.

Figure 1:
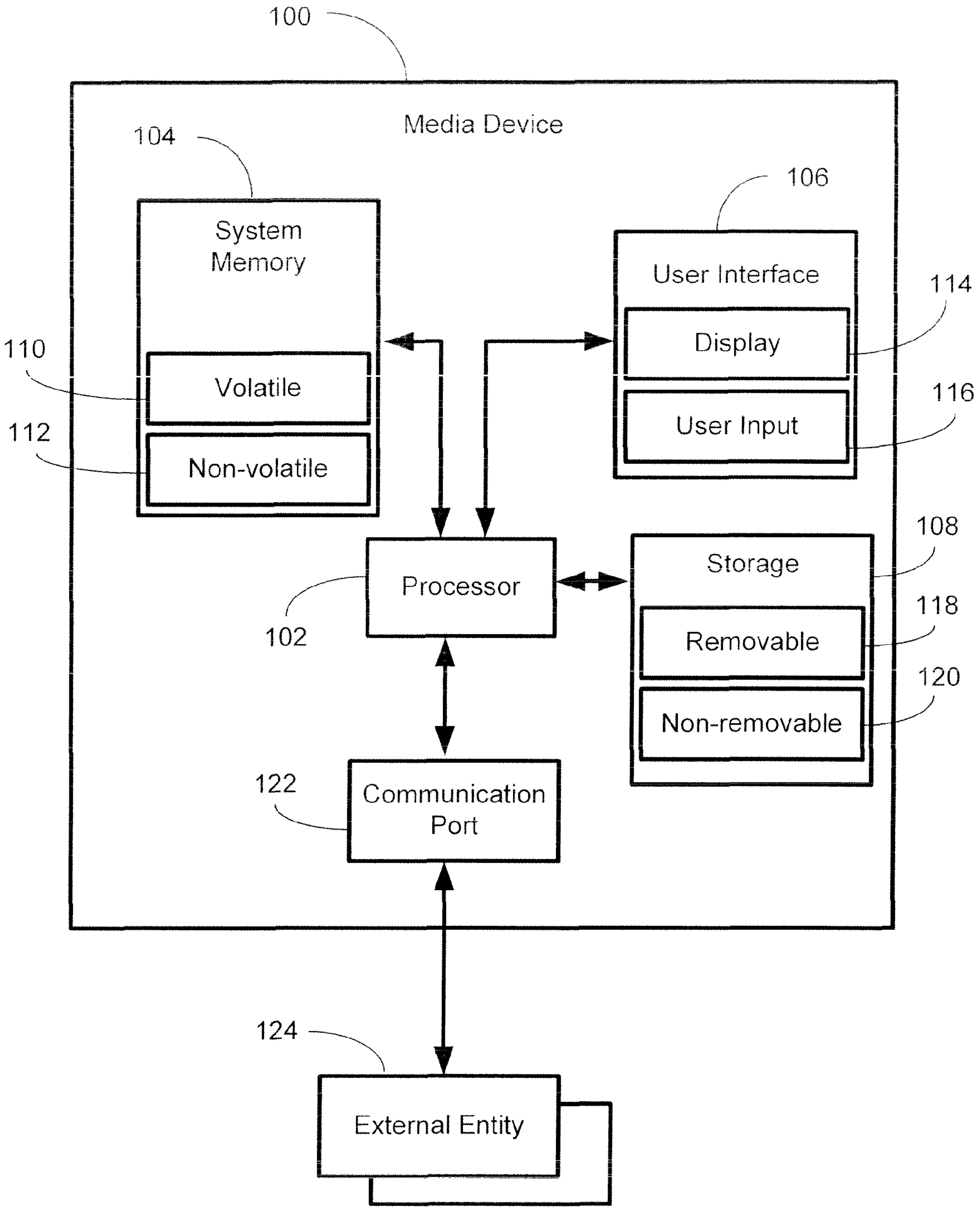
FIG. 1 is an illustration of hardware for a portable media device.

FIG. 1 is an illustration of exemplary hardware that may be used for a media device 100. The media device 100 may have a processing unit 102, a memory 104, a user interface 106, a storage device 108 and a power source (not shown). The memory 104 may include volatile memory 110 (such as RAM), non-volatile memory 112 (such as ROM, flash memory, etc.) or some combination of the two or any other form of storage device. The media device 100 may also include additional storage 108 (removable and/or non-removable) including, but not limited to, magnetic or optical disks or tape or any other memory. Such additional storage is illustrated in FIG. 1 by removable storage 118 and non-removable storage 120. Computer storage media includes volatile and nonvolatile, removable and non-removable media implemented in any method or technology for storage of information such as computer readable instructions, data structures, program modules, digital media, or other data.

The processing unit 102 may be any processing unit 102 capable of executing computer code to decode media data from a compressed format into a usable form fast enough such that music and video may be played continuously without skips or jumps. When in a portable media device, it may also be useful if the processor 102 is efficient in using power to increase the life of the power source. The processing unit 102 may also be used to execute code to support a user interface and external communications.

The user interface may include one or more displays 114 for both displaying control information and displaying viewable media. The display 114 may be a color LCD screen that fits inside the device 100. User input(s) 116 may include manual buttons, soft buttons, or a combination of both. In addition, the user input may be gesture driven which may use no buttons or may be voice activated. Soft buttons may be used when the display 114 includes a touch screen capability. Manual buttons may include re-definable keys with programmable legends.

The media device 100 may also contain communication connection(s) 122 that allow the device 100 to communicate with external entities 124, such as network endpoints or a computer used for synchronization. Communications connections(s) 122 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media The power source may be a battery that may be rechargeable. The power source may also be a standard battery of an input from a power converter or any other source of power.

In operation, a user may use the user interface to select and play a media object. During playback of the media object, creation of a mark object may be initiated by a user via a user interface element, such as a soft key. A useful option when creating a mark object may be to obtain additional information about the media object using the mark object.

Figure 2:
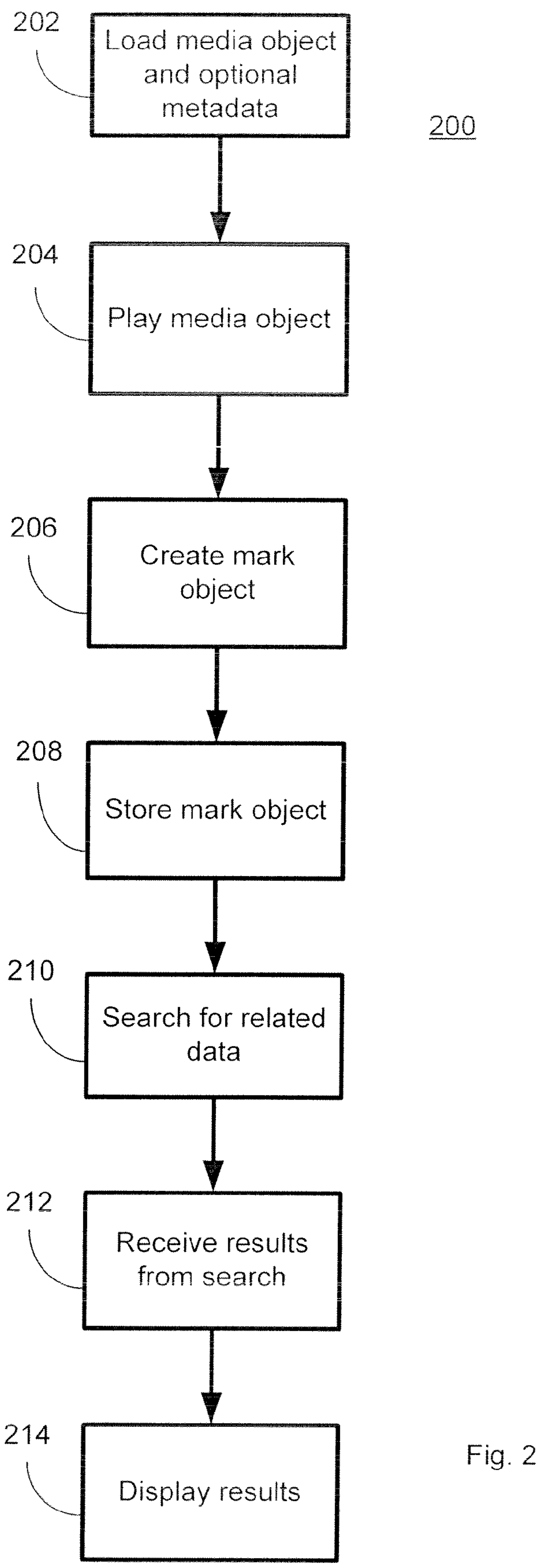
FIG. 2 is a flow chart of a method of creating and using an earmark for a media object to obtain additional information about the media object.

Referring to FIG. 2, a flow chart of a method 200 of creating and using an earmark or a mark object for a media object, is discussed and described. At block 202, a media object may be loaded onto a media device, such as a media device 100 of FIG. 1, capable of playing MP3 audio, MPEG video, streaming video or the like. The media object may be music, video, audio programming or any data played back using a sequential based format. Optionally, metadata corresponding to the media object may also be loaded onto the media device. The metadata may be incorporated in the media object or may be a separate file associated with the media object.

At block 204, the media object may be played using the user interface, or played automatically by a programmable activation trigger. During playback of the media object, at block 206, creation of a mark object may be initiated by a user via a user interface element, such as a soft key. The mark object may be persistent, that is, permanently stored, or may be transitory, stored only in local volatile memory. The complexity of the mark object may vary substantially over different embodiments based on where and how much metadata or reference information is immediately available. In one embodiment, only a media object identifier and sequence indicator is used as the mark object. In such an embodiment, virtually all the metadata or reference information is gathered from sources outside the media object itself, either locally or remotely. In another exemplary embodiment, when the media object contains its own metadata, creation of the mark object includes extracting metadata from the media object so that the mark object itself may include metadata corresponding to the media object. How the metadata is used in discussed more in depth at block 210.

The metadata may be more or less specific to a given sequence. That is, some metadata may be appropriate to all segment of the playback, such as producer or director. Other metadata may be specific to a very narrow time range, for example, a five second sequence of a specific car driving through a city street.

The metadata itself may vary substantially based on a particular embodiment. In one embodiment, the metadata has specific keywords used as part of a web search. For example, metadata about a James Bond movie may include keywords related to the type of car driven by James Bond, the type of champagne preferred by James Bond, the agency that employs James Bond, etc., and all may be keywords used in a search for additional information at block 210.

In another embodiment, the metadata includes a universal resource locator (URL) and may represent a web destination of its own, for example, a specific product page in a company's on-line store. Referring again to the James Bond example, the metadata may contain the URL of www.jamesbond.com where past James Bond movies may be purchased. As additional James Bond movies are made, these may be added to the web site, making it useful to have this additional data stored remotely where data may be added easier than data stored on the media player itself.

In yet another embodiment, the metadata has pre-determined information about the sequence of the media in question, such as artists, instrument, actors, locations, etc. Such information may be anticipated as likely to be requested and is also relatively stable. Metadata that is complete of itself may be directly displayable on the media device itself without use of a network or communication port. For example, the metadata may include an actor's name, a product identifier or brand name, or a geographic location (e.g. Central Park). Although the metadata may be stable, it still may be communicated to a search engine to obtain the most up to date information available.

In another embodiment, the metadata includes a combination of key words and URLs. To illustrate a range of embodiments, segment 1:00-1:05 of an MP3 audio track may be associated with URL metadata that points to a record label's web site. The URL metadata is communicated to an outside network where the URL is used to obtain a web site of the record label. Upon reaching the web site of the record label using the URL in the metadata, the key words in the metadata that contain a list of musicians and their instruments playing during that period of the audio track are used to search the record label's web site for additional information about the musicians.

To illustrate another example of what the metadata may contain, at minute 22:00 of a movie, an actor in business attire may leave a subway station and walk into a hotel. Associated metadata may include the actor's name, the brand name of the suit worn by the actor, and a URL pointing to the hotel's web site. A combination of web search and navigation to a web destination may be incorporated into the data session based on the metadata.

In another exemplary embodiment, the metadata includes a schema with all the artists who perform on a track listed by identifier along with references by artist identifier by sequence in the track. An inquiry regarding a guest vocalist may be answered without referring the query to an outside network, such as an Internet search. However, additional information request, for example, a request related to the guest vocalist may be communicated to an outside network using the data from the locally-generated answer as metadata.

To accommodate scenes or thematic music elements, the metadata may be organized by sequence. Using the illustration above, the scene of the actor walking into the hotel may play from minute 20:05 to minute 23:30. Any mark object falling in that time range may cause an association to the same metadata. More relationships between mark objects and metadata are discussed with respect to FIGS. 3-6.

The sequence in a media object may be extracted according to the digital media itself. In one embodiment, the time may be cumulative from the start, while in another embodiment the time may be associated with an MPEG frame reference. In still another embodiment, the time may come from a presentation time stamp (PTS) in streaming video.

At block 208, the mark object may be store. A nominal amount of storage and network access allows utilization both local and remote metadata searches. Alternatively, the mark object may be sent to another computer or device for further processing when the media device 100 has a relatively small amount of storage or does not have a suitable network connection. As discussed above, the mark object may include as little as a media identifier and time reference and the mark object may be supplemented with locally available metadata before being sent to another device to perform the search.

At block 210, a search for related data may be performed using metadata retrieved that is related the mark object. The execution of the search may depend on the metadata. In one implementation, the player first determines whether the metadata or mark object is related to data stored locally. This determination may be made by reviewing the metadata. In one embodiment, a flag indicates where the additional data is located. For example, the flag may indicate that the data is stored locally, that the data is stored on a specific outside network or that the metadata is meant to be submitted to a general search site such as www.live.com. In another embodiment, the metadata is analyzed by the media player to determine if there is sufficient relevant information stored locally to answer the request. The analysis may using a matching algorithm to match the metadata related to the mark object and the data stored locally and may determine if there is a sufficient overlap such that the local data is sufficiently relevant to be displayed. Matching algorithms are known and many such matching algorithms may be appropriate.

If the data is stored locally, it is displayed. As an example, metadata that is complete of itself and is stored locally may be directly displayable on the media device itself without the use of an outside network. Although the metadata may be stable, it still may be passed to a search engine to obtain the most up to date information available. In addition, the user may be presented the option to request additional information beyond that stored locally and the metadata may be communicated to an outside network.

If the data is not stored locally, the metadata may be communicated to an outside network for the retrieval of additional information. The communication to an outside network may involve communication of the metadata over the communication port 122 with the external entity 124 to either directly or indirectly perform a search, such as a web search, using the metadata as a keywords. The communication to the outside network may occur in any manner, such as wirelessly or through a wired connection.

Figure 3A:
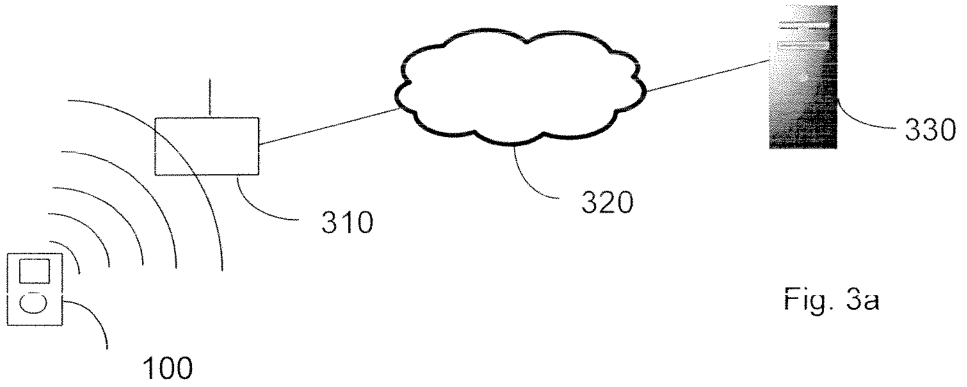
FIG. 3*a* is a block diagram of a media player communicating metadata to an outside network.
Figure 3B:
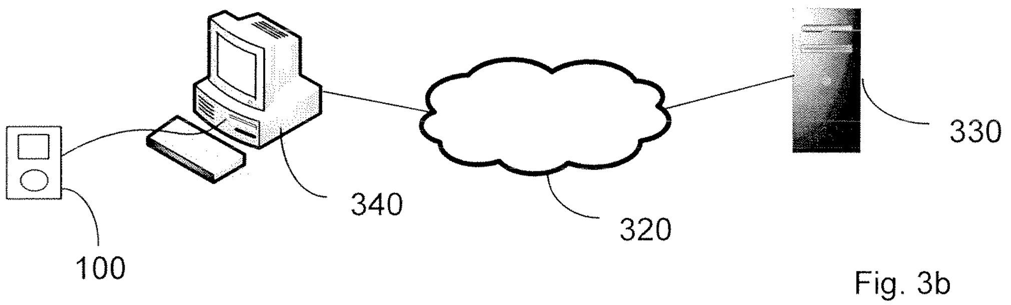

FIGS. 3*a* and 3*b* are illustrations of possible ways to communicate with an outside network. In FIG. 3*a*, the media player 100 uses the communication port 122 to communicate with a wireless network access point 310 (which is an example of the external entity 124 from FIG. 1). The wireless network access point 310 communicates through the internet 320 or another other appropriate network to a server 330. As previously described, depending on the metadata, the metadata may be communicated to a server 330 at a general search site, to a server 330 at a specific URL of a vendor, to a server 330 at a URL designed to respond to communications from portable media players 100, or to any other relevant network site. FIG. 3*b* is an illustration of an embodiment where the media player 100 is in communication with a personal computer 340 (which is another example of a possible external entity 124) that has network access, such as access to the internet. Similar to FIG. 3*a*, the communications are routed through the network 320 to the appropriate server depending on the metadata.

In another embodiment, the web address may be stored and the additional data may be obtained at a point in the future when internet access is available. For example, while on an airplane, internet access may not be available and a message may be displayed stating that the request for additional information was received but internet access is not currently available and the additional information will be displayed once internet access is available. Accordingly, in the airport after the flight, internet access may be available in the airport and the additional information may be obtained. In another embodiment, the display of additional information may wait for the portable media player to be directly connected to a network with internet access.

In other situations, the media player may determine that the desired data is not stored locally and the metadata may be passed to a network to obtain additional information. For example, if the metadata includes a URL to a web address not present on the media player, the URL may be communicated to an outside network to obtain the additional data at the URL.

The communication of the data to an outside network may occur in a variety of ways. In one embodiment, the metadata is preformatted to be directly communicated to a network such as the Internet. One such example is a world wide web URL. The media player recognizes that the requested data is not store locally and is meant for an outside network and the data is communicated to an outside network.

In another embodiment, the metadata contains search terms that are preformatted to be communicated to a general search engine such a www.live.com. The media player recognizes that the metadata is not stored locally but is meant to be communicated to an outside network.

In yet another embodiment, the metadata may be communicated to an internet site operated specifically to respond to media player communications. In this way, the metadata can be formatted in a manner to speed communication and deliver better results. For example, an Internet site may return data that is formatted to be clearly displayed on a media player.

In one embodiment, the additional information is provided by a third party. For example, by selecting a car, the link may be to a location where a third party may provide the additional information to be displayed. In this way, the content of the additional information may be easily changed. Related, the ability to provide the additional information is available to be purchased. For example, many car companies may be interested in providing additional information when as additional object related to a car is selected. As such, car companies may be willing to buy the right to display additional information about the additional object selected.

In another embodiment, an auction framework is established to sell the rights to provide additional information in the media. The auction framework may operate in any known auction format. As an example, a list of available requests for additional information may be made and bidders may be able to enter bids to provide the additional information. The auction may be in advance of the additional object being selected or the auction may occur every time someone selects the additional object.

In yet another embodiment, the pool of data that is searched may be created in advance and this pool may be limited. For example, the pool of data may be populated with data from people willing to pay to have their data displayed and this data may be preformatted to fit easily of the portable media player.

In another embodiment, the metadata may contain a mixture of data that is store locally and is stored remotely. In such cases, the media player may display the local data first and then present the user an option to request more data from an outside network. In another embodiment, the media player may display the local data and start retrieving the data from the outside network. When the data is retrieved, the user may be presented the option to see the additionally retrieved data.

The use of image analysis or scene identifiers may be used instead of or in supplement to metadata-based query support. A cursor-oriented user interface may be used to indicate a location on the screen with a cursor click on a spot on the scene. The cursor click inherently marks a playback segment. An examination of the scene may use image analysis at the point of the cursor mark to use edge analysis or other pattern recognition technique to identify the shape indicated. The shape may be used as a key for a local or remote search to retrieved additional information about shape.

In another embodiment, an object being displayed during a segment of the media object has specific metadata associated with it. For example, if a Porsche is displayed for a sequence in a movie, the Porsche may be coded as an additional object that may be marked by a user and additional information may be displayed related to the marked selectable object. In one embodiment, a symbol on the display notes that a selectable object that can be selected is being displayed. In another embodiment, the perimeter of the display is changed to note that a selectable object is being displayed. In another embodiment, the presence of a selectable object is noted by a noise. In yet another embodiment, the presence of a selectable object is noted by the portable player vibrating. Of course, other methods of alerting a user that a selectable object is present are possible.

In another embodiment, the presence of a selectable object may not be noted. However, a user may create a mark object and this mark object may be matched against previously determined selectable objects. This matching may be internal to the portable media device or the mark object may be communicated to an outside source and the matching may be made at the outside source. In any case, the mark object is used to determine if a selectable object was selected.

Additionally, outside networks may include additional features besides just information. For example, a record label web site may include a "listeners who like this also enjoyed . . . " to help promote related items. Other potential additional items include sales, locations, store hours, phone numbers, etc.

In some embodiments, the metadata may include executable code for presenting a user with search options related to the media object. For example, the metadata may include HTML statements for presenting a user with search options such as whether to search using keywords from the metadata or to select from a list of destination URLs from the metadata. User options may also include allowing the user to view locally available metadata before launching an external search.

At block 212, the results may be returned and at block 214, the results may be displayed. When the results are returned, they may be communicated to and stored on the media device 100, even though the search may have been performed at a network accessible computer. The results may be added to locally available media object metadata to save time if the same query is made at a later time.

In some embodiments, the method will report to a billing routine billing data related to the additional information provided. The additional information may be useful to a user but many advertisers would be willing to pay to provide information related to a search directed toward their product. However, advertisers want feedback on their advertisements. At a minimum, advertisers may want to know how many times additional information about their specific product was provided as this would be a logical measure of how much the advertiser should pay for providing this additional information.

In another embodiment, the method may monitor the response to the additional data. For example, if a user immediately closes the window when additional information is provided, this additional information may not be seen as especially useful. In another example, if the user repeatedly views the additional information, this may provide additional value to the advertiser. The response of the user may be provided to the billing routine as the formulas to charge an advertiser can be complex and this data may be used to determine an amount to charge an advertiser.

In implementation, the media player itself may track the display of additional data and this information may be periodically communicated to a billing routine outside of the media player. For example, the additional information displayed may be communicated to a central billing web site when the media player is in contact with a wireless network portal or when the media player is synced with a computer that has network access. In another embodiment, if a dedicated web site is used to deliver additional data to the media player, the dedicated web site may track the additional data communicated and this tracking information will be used for billing purposes. Billing information may include if the user repeatedly views the additional information, watched the additional information for a significant period of time, places an order or request further additional information using the additional information, etc.

Other combinations of metadata and search result sources are apparent to those of ordinary skill, including searches made on accessible devices in an ad-hoc network community.

Figure 4:
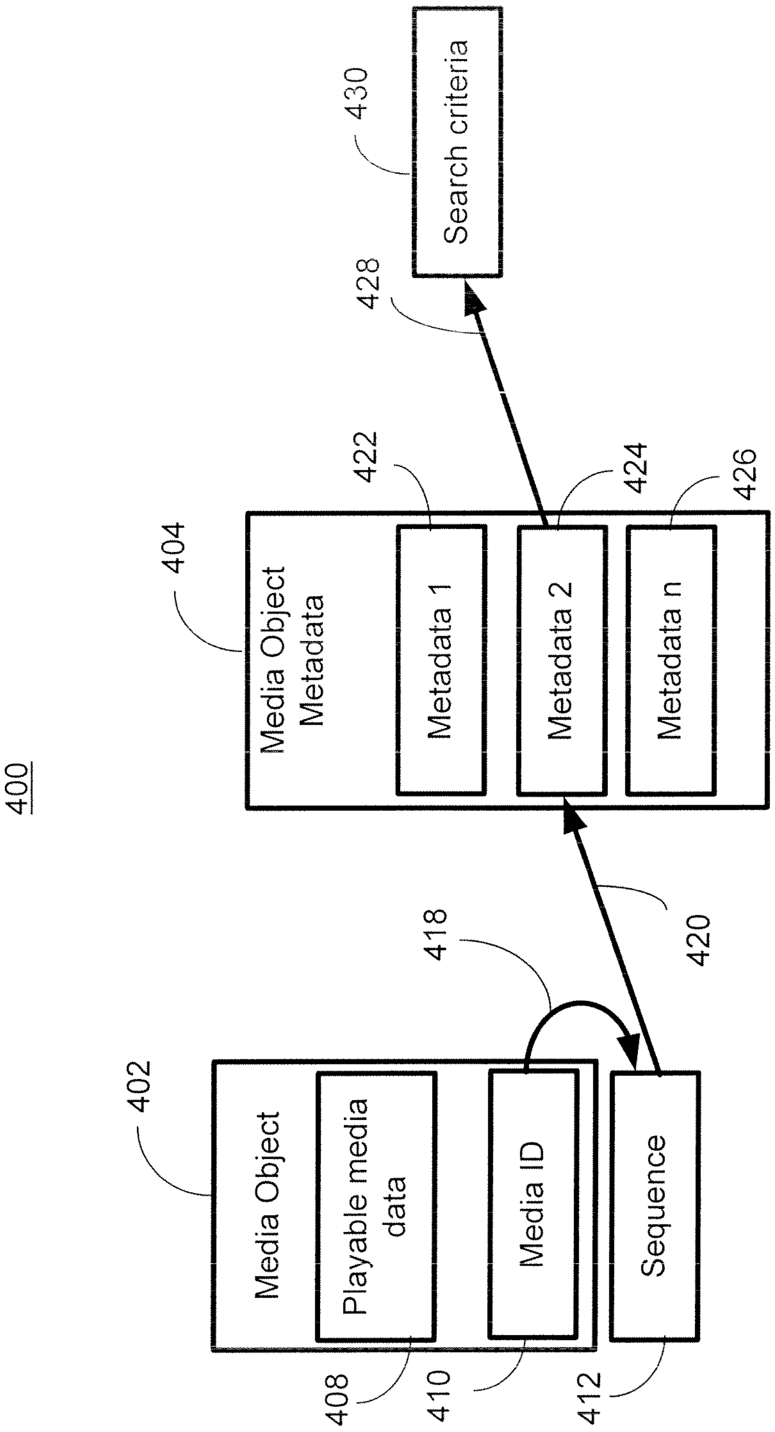
FIG. 4 is a block diagram of media object and media object metadata relationships.

FIG. 4-FIG. 7 illustrate a few of the many possible combinations of mark object capture and metadata association. FIG. 4 depicts an embodiment of a media object 402 and a separate file including media object metadata 404. The media object 402 also includes a media identifier 410. When a mark object is created, the media identifier 410 is passed over logical link 418 and incorporated with a sequence reference 412, discussed above. The information is stored and passed over link 420 and used in selecting appropriate sequence-specific media object metadata from the set of media object metadata item 422 424 426. In the illustration, the sequence 412 matches the second metadata 424. Using the second metadata 424, a search may be launched over link 428 using the search criteria extracted from the metadata, as described above.

Figure 5:
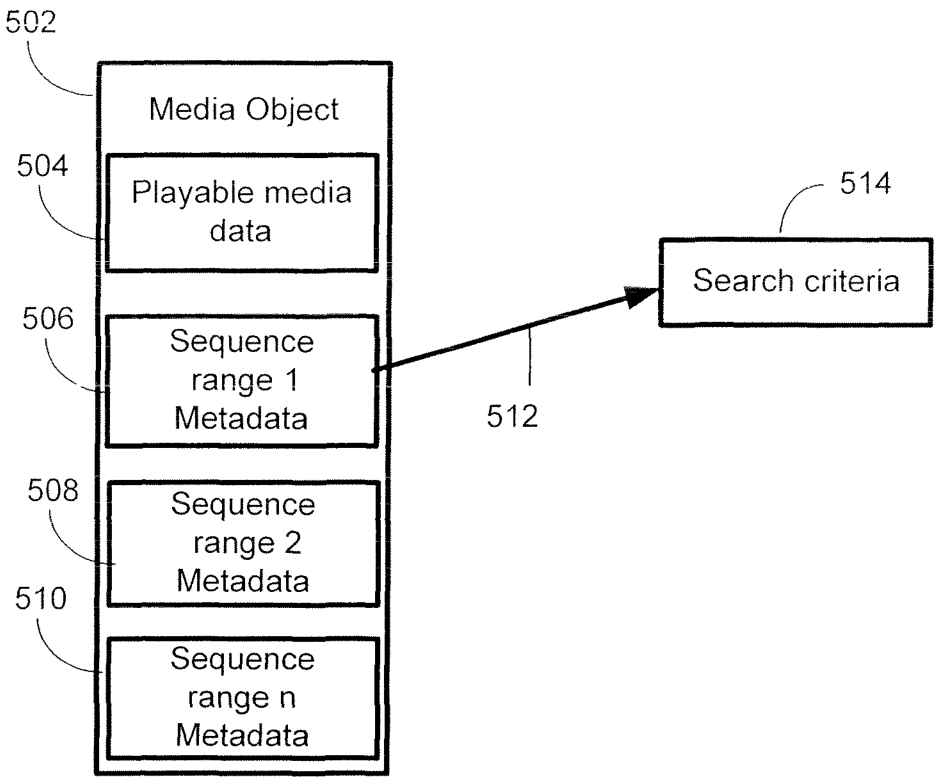
FIG. 5 is a block diagram of an alternate configuration of media object and media object metadata relationships.

FIG. 5 shows another instance of a media object 502 and playable media data 504. In this embodiment, the metadata is organized by sequence range as metadata 506 508 510 and store in the media object file 502. Because the metadata is immediately accessible, link 512 is used to launch a search directly using search criteria 514 extracted from the metadata 506. The metadata may include actionable items. For example, a movie scene in a department store may have metadata that, when accessed, displays a description of the scene and a list of actions that can be taken. When the viewer marks a scene and later reviews the marked items, an item for the movie may include a notation that includes the flag for that scene. The notation may include a list of actions that can be taken, such as shopping at the department store (a link and passed parameter, for example), a travel agency for a trip to that city, sporting event tickets, etc. Other actionable items may include health and beauty advice, financial services, family counseling, etc. depending on the scene and the context. Internally stored metadata, as here, and externally store metadata of FIG. 4 each have advantages in terms of accessibility for one and ease of updates for the other.

Figure 6:
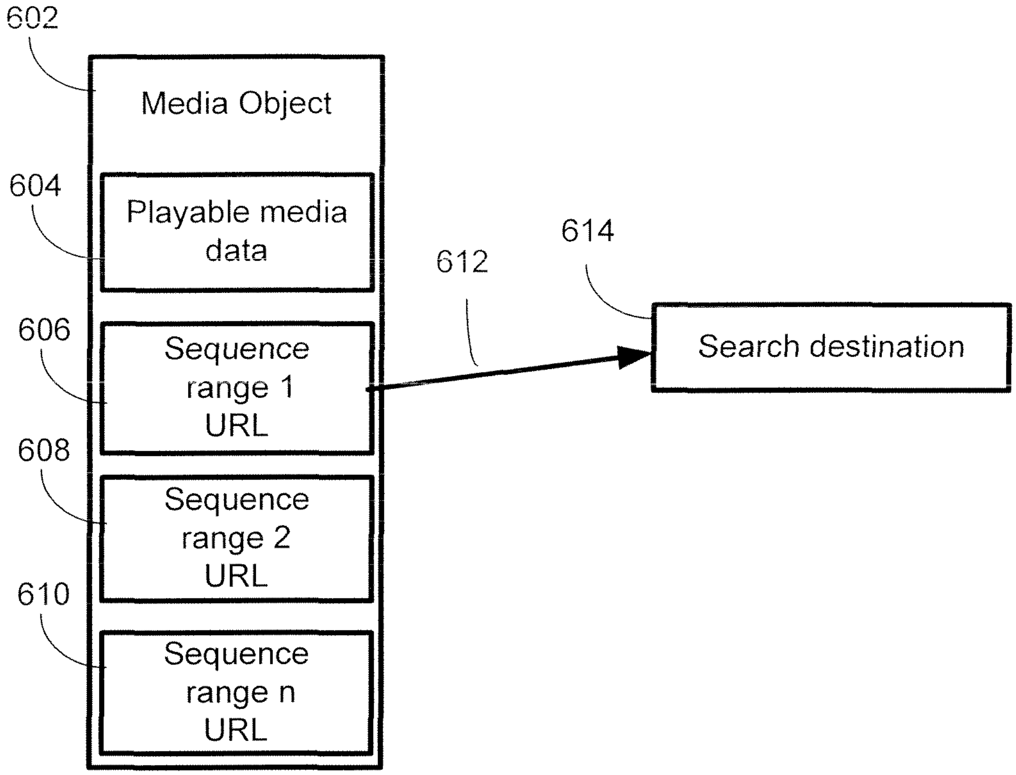
FIG. 6 is a block diagram of an alternate configuration of media object and media object metadata relationships.

FIG. 6 illustrate another embodiment using metadata 606 608 610 embedded directly in a media object 602 also having playable media data 604. In this exemplary embodiment, the metadata is a series of URLs, each associated with a different sequence range. As opposed to FIG. 5, where the metadata was used to develop search criteria, here the URL is used over link 612 to immediately access a destination 614 pointed to by the URL.

Figure 7:
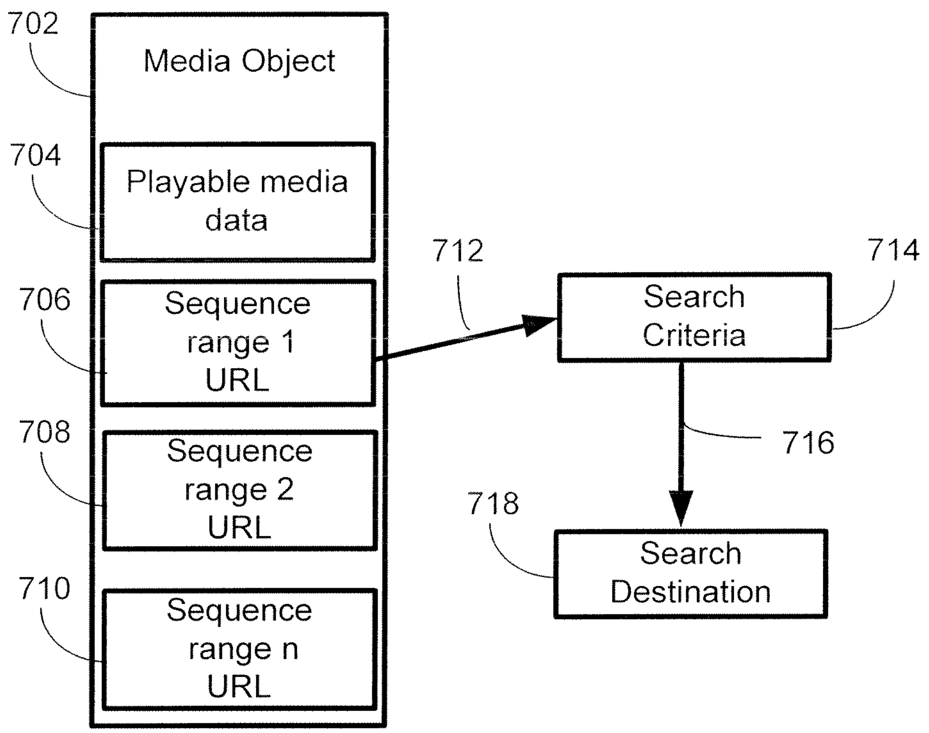
FIG. 7 is a block diagram of still another alternate configuration of media object and media object metadata relationships.

FIG. 7 illustrates yet another embodiment of 'earmarking' in a media object. The media object 702 may include both playable media data 704 and a set of metadata 706 708 710 each having one or more URLs and indexed by a sequence or time range. The link 612 may support access of a destination URL that is not an 'endpoint' for data, as in FIG. 6, but is rather a storage location for search criteria 714, such as keywords and URLs related to the mark object, as discussed above. The search criteria 714 may then use line 716 to access destination information 718. While this approach requires more network 'hops' than other embodiments, such as shown in FIG. 5 or 6, the use of an intermediary for gathering search criteria 714 allows for the latest information to be referenced and continuously supplemented.

The use of mark objects to create search criteria targeting sequence-oriented elements of a media object greatly expands the amount of information available to a consumer of media without burdening the media producer with changes to media data formats or media storage capability. However, as more data storage space becomes available through technologies such as HD-DVD, the ability to add items of interest directly to the media will become more commonplace. Earmarking provides a useful way to make such additional data available to both current and future media object consumers. The techniques described above allow backward compatibility to 'small media' such as CDs using external metadata and forward compatibility with more dense storage media incorporating integral time-organized data.

Although the forgoing text sets forth a detailed description of numerous different embodiments of the invention, it should be understood that the scope of the invention in defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

We claim:

1. In a portable media device, a method comprising:

determining that a content consumer has created a mark during a playback of an instance of media, the mark being separate from the instance of media and including an identifier for the instance of media and a time reference that indicates a point during the playback of the instance of media at which the mark was created;

ascertaining a sequence of the instance of media that corresponds to the time reference and an identifier for the sequence, the instance of media including multiple sequences;

retrieving, using the identifier for the sequence, metadata that is particular to the sequence, the metadata including one or more keywords that are particular to at least one of a visual aspect or an audible aspect of content included in the sequence;

using the retrieved metadata to obtain additional information related to the sequence, said using including communicating the one or more keywords to an external search engine; and causing the additional information to be output via the portable media device, said causing including causing at least a portion of a search result received from the search engine to be output via the portable device.

2. The method of claim 1, wherein the metadata comprises at least one selected from the group comprising:

links to external web sites; and additional information to be displayed about the instance of media.

3. The method of claim 1, further comprising determining whether the additional information is stored in a local memory and if the additional information is stored locally, retrieving the additional information from the local memory.

4. The method of claim 1, wherein the metadata further identifies a specific search engine to which the one or more keywords are to be communicated.

5. The method of claim 1, wherein using the retrieved metadata to obtain additional information related to the sequence further comprises analyzing the metadata and if the metadata has links to an external network, communicating the links to the external network.

6. The method of claim 1, wherein using the retrieved metadata to obtain additional information related to the sequence further comprises determining that the metadata contains both links to external networks and the one or more keywords, and communicating the links to the network and searching the linked site using the one or more keywords.

7. The method of claim 1, further comprising communicating the metadata to a network site designed to respond to the metadata from the portable media player.

8. The method of claim 1, wherein the additional information is provided by a third party.

9. The method of claim 1, wherein the right to provide the additional information is available to be purchased.

10. The method of claim 9, wherein the right to provide the additional information is available to be purchased in an auction.

11. The method of claim 10, wherein the auction occurs each time the request for additional information is made.

12. The method of claim 1, further comprising monitoring a response to the additional data.

13. The method of claim 12, wherein monitoring the response further comprises one selected from the group comprising:

determining how long the additional information was displayed;

determining whether additional selections were made in response to the additional information; and determining whether additional goods or service were purchased using the additional information.

14. The method of claim 13, wherein whether additional selections were made in response to the additional information is communicated as part of billing data.

15. A computer readable hardware storage medium embodying computer executable instructions that are executable to implement a method comprising:

determining that a content consumer has created a mark during a playback of an instance of media that includes multiple sequences, the mark being separate from the instance of media and including a reference to a specific sequence of the multiple sequences;

retrieving, using the reference to the specific sequence, metadata that is particular to the specific sequence, the metadata including one or more keywords that are particular to at least one of a visual aspect or an audible aspect of content included in the specific sequence;

reviewing the metadata to determine whether additional information that is particular to the specific sequence is stored in a local memory;

if the additional information is stored locally, retrieving the additional information from the local memory;

if the additional information is not stored locally, retrieving the additional information from an outside source; and displaying to the content consumer the additional information.

16. The computer readable hardware storage medium of claim 15, wherein the third party purchased the right to provide the additional information via an auction.

17. The computer readable hardware storage medium of claim 15, wherein the method further comprises:

analyzing the metadata and if the metadata has links to an external network, communicating the links to the external network; and if the metadata has one or more keywords, communicating the one or more keywords to a search engine.

18. A portable media device comprising:

one or more processors; and a hardware memory storing computer executable instructions that are executable by the one or more processors to perform operations comprising:

determining that a content consumer has created a mark during a playback of an instance of media, the mark being separate from the instance of media and including an identifier for the instance of media and a time reference that indicates a point during the playback of the instance of media at which the mark was created;

ascertaining a sequence of the instance of media that corresponds to the time reference and an identifier for the sequence, the instance of media including multiple different sequences;

relating the identifier for the sequence to metadata for the sequence, the metadata including one or more keywords that are particular to at least one of a visual aspect or an audible aspect of content included in the specific sequence;

retrieving the metadata;

reviewing to determine whether additional information that is specific to the sequence is stored in a local memory;

if the additional information is stored locally, retrieving the additional information from the local memory;

if the additional information is not stored locally, retrieving the additional information from an outside source; and causing the additional information to be displayed via the portable media device.

19. The portable media device of claim 18, the computer executable instructions being executable by the processor to perform further operations comprising:

monitoring a response at the portable media device to the additional information; and ascertaining, based on the response, a charge to the third party for causing the additional information to be displayed.

20. The portable media device of claim 18, the computer executable instructions being executable by the processor to perform further operations comprising:

analyzing the metadata and if the metadata has links to an external network, communicating the links to the external network; and if the metadata has one or more keywords, communicating the one or more keywords to a search engine.

* * * * *